US009798804B2

(12) United States Patent
Shimogori et al.

(10) Patent No.: US 9,798,804 B2
(45) Date of Patent: Oct. 24, 2017

(54) INFORMATION PROCESSING APPARATUS, INFORMATION PROCESSING METHOD AND COMPUTER PROGRAM PRODUCT

(75) Inventors: Nobuhiro Shimogori, Kanagawa (JP); Tomoo Ikeda, Tokyo (JP); Kouji Ueno, Kanagawa (JP); Osamu Nishiyama, Kanagawa (JP); Hirokazu Suzuki, Tokyo (JP); Manabu Nagao, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 316 days.

(21) Appl. No.: 13/533,091

(22) Filed: Jun. 26, 2012

(65) Prior Publication Data

US 2013/0080163 A1 Mar. 28, 2013

(30) Foreign Application Priority Data

Sep. 26, 2011 (JP) .................................. 2011-208968

(51) Int. Cl.
*G10L 15/08* (2006.01)
*G10L 21/00* (2013.01)
(Continued)

(52) U.S. Cl.
CPC ........ *G06F 17/30743* (2013.01); *G10L 15/26* (2013.01)

(58) Field of Classification Search
CPC .. G10L 15/265; G10L 15/22; H04M 2201/40; H04M 2201/60; G06F 17/30746
(Continued)

(56) References Cited

U.S. PATENT DOCUMENTS 5,031,113 A * 7/1991 Hollerbauer ............ G10L 15/22
                                                704/235
5,278,943 A * 1/1994 Gasper et al. ................ 704/200
(Continued)

FOREIGN PATENT DOCUMENTS

JP         2000-285112      10/2000

OTHER PUBLICATIONS

Leung, H.C., et al. "A Procedure for Automatic Alignment of Phonetic Transcriptions With Continuous Speech." Proceedings of ICASSP 84, 1984, pp. 2.7.1 to 2.7.3.*

*Primary Examiner* — Fariba Sirjani
(74) *Attorney, Agent, or Firm* — Amin, Turocy & Watson LLP

(57) ABSTRACT

According to an embodiment, an information processing apparatus includes a storage unit, a detector, an acquisition unit, and a search unit. The storage unit configured to store therein voice indices, each of which associates a character string included in voice text data obtained from a voice recognition process with voice positional information, the voice positional information indicating a temporal position in the voice data and corresponding to the character string. The acquisition unit acquires reading information being at least a part of a character string representing a reading of a phrase to be transcribed from the voice data played back. The search unit specifies, as search targets, character strings whose associated voice positional information is included in the played-back section information among the character strings included in the voice indices, and retrieves a character string including the reading represented by the reading information from among the specified character strings.

10 Claims, 4 Drawing Sheets

(51) Int. Cl.
*G06F 17/30* (2006.01)
*G10L 15/26* (2006.01)

(58) Field of Classification Search
USPC .......................................... 704/235
See application file for complete search history.

(56) References Cited

U.S. PATENT DOCUMENTS

| | | | | |
|---|---|---|---|---|
| 5,333,275 | A * | 7/1994 | Wheatley | G10L 15/18 704/231 |
| 5,649,060 | A * | 7/1997 | Ellozy et al. | 704/278 |
| 5,909,667 | A * | 6/1999 | Leontiades | G06F 3/167 704/235 |
| 6,076,059 | A * | 6/2000 | Glickman et al. | 704/260 |
| 6,151,576 | A * | 11/2000 | Warnock et al. | 704/260 |
| 6,226,615 | B1 * | 5/2001 | Kirby et al. | 704/272 |
| 6,260,011 | B1 * | 7/2001 | Heckerman et al. | 704/235 |
| 6,360,237 | B1 * | 3/2002 | Schulz | G10L 15/22 704/231 |
| 6,505,153 | B1 * | 1/2003 | Van Thong | H04N 5/278 348/462 |
| 6,735,565 | B2 * | 5/2004 | Gschwendtner | G10L 15/08 704/231 |
| 6,792,409 | B2 * | 9/2004 | Wutte | 704/276 |
| 6,882,970 | B1 * | 4/2005 | Garner et al. | 704/236 |
| 6,961,895 | B1 * | 11/2005 | Beran et al. | 715/203 |
| 7,174,295 | B1 * | 2/2007 | Kivimaki | 704/260 |
| 7,212,968 | B1 * | 5/2007 | Garner et al. | 704/251 |
| 7,346,506 | B2 * | 3/2008 | Lueck et al. | 704/235 |
| 7,412,643 | B1 * | 8/2008 | Fischer et al. | 715/200 |
| 8,019,163 | B2 * | 9/2011 | Momosaki | G06F 17/30743 369/1 |
| 8,355,920 | B2 * | 1/2013 | Gopinath et al. | 704/270 |
| 8,407,052 | B2 * | 3/2013 | Hager | G06F 17/273 704/231 |
| 8,560,327 | B2 * | 10/2013 | Neubacher et al. | 704/278 |
| 2002/0143534 | A1 * | 10/2002 | Hol | 704/235 |
| 2002/0163533 | A1 * | 11/2002 | Trovato | G10H 1/368 715/728 |
| 2005/0159957 | A1 * | 7/2005 | Roth et al. | 704/276 |
| 2005/0203750 | A1 * | 9/2005 | Miyamoto et al. | 704/276 |
| 2006/0190249 | A1 * | 8/2006 | Kahn et al. | 704/235 |
| 2006/0222318 | A1 * | 10/2006 | Momosaki | G06F 17/30743 386/241 |
| 2007/0038450 | A1 * | 2/2007 | Josifovski | G06F 17/30265 704/255 |
| 2007/0106508 | A1 * | 5/2007 | Kahn et al. | 704/235 |
| 2007/0106509 | A1 * | 5/2007 | Acero | G06F 17/30746 704/240 |
| 2007/0106685 | A1 * | 5/2007 | Houh | G06F 17/30796 |
| 2007/0126926 | A1 * | 6/2007 | Miyamoto | H04N 7/0885 348/468 |
| 2007/0198266 | A1 * | 8/2007 | Li | G10L 15/08 704/255 |
| 2007/0208567 | A1 * | 9/2007 | Amento | G10L 15/22 704/270 |
| 2007/0213979 | A1 * | 9/2007 | Meermeier | 704/231 |
| 2008/0133219 | A1 * | 6/2008 | Doulton | 704/8 |
| 2008/0177623 | A1 * | 7/2008 | Fritsch | G06Q 10/0633 705/7.27 |
| 2008/0195370 | A1 * | 8/2008 | Neubacher et al. | 704/1 |
| 2008/0221881 | A1 * | 9/2008 | Carraux | G10L 15/22 704/235 |
| 2008/0270344 | A1 * | 10/2008 | Yurick | G06F 17/30026 |
| 2009/0119101 | A1 * | 5/2009 | Griggs | G10L 15/26 704/235 |
| 2009/0306981 | A1 * | 12/2009 | Cromack | G06F 17/30743 704/235 |
| 2009/0319265 | A1 * | 12/2009 | Wittenstein | G10L 15/26 704/234 |
| 2010/0063815 | A1 * | 3/2010 | Cloran | G06Q 10/10 704/235 |
| 2011/0054901 | A1 * | 3/2011 | Qin | G06F 17/2827 704/254 |
| 2011/0288862 | A1 * | 11/2011 | Todic | G10L 15/05 704/235 |
| 2012/0016671 | A1 * | 1/2012 | Jaggi | G10L 15/22 704/235 |
| 2012/0078712 | A1 * | 3/2012 | Fontana | G06Q 30/0251 705/14.49 |
| 2012/0245936 | A1 * | 9/2012 | Treglia | G06F 17/30746 704/235 |
| 2012/0278071 | A1 * | 11/2012 | Garland | H04M 11/10 704/235 |
| 2013/0030805 | A1 * | 1/2013 | Suzuki et al. | 704/235 |
| 2013/0030806 | A1 * | 1/2013 | Ueno et al. | 704/235 |
| 2013/0080163 | A1 * | 3/2013 | Shimogori et al. | 704/235 |
| 2013/0191125 | A1 * | 7/2013 | Suzuki et al. | 704/235 |
| 2014/0207454 | A1 * | 7/2014 | Nakata et al. | 704/235 |
| 2015/0170649 | A1 * | 6/2015 | Ashikawa | G10L 15/22 704/235 |

* cited by examiner

FIG.2A

VOICE INDICES OF VOICE DATA IO

| ID | PREVIOUS NODE | NEXT NODE | VOICE POSITIONAL INFORMATION (s) | | UNIT OF DIVISION | |
| --- | --- | --- | --- | --- | --- | --- |
| | | | START POINT | END POINT | MORPHEME | READING |
| 1 | S | 1 | 0 | 0.25 | 今日 ~10e | KYOU |
| 2 | S | 3 | 0 | 0.5 | 京都 ~10a | KYOUTO |
| 3 | 1 | 3 | 0.25 | 0.5 | の ~10i | NO |
| 4 | 1 | 2 | 0.25 | 0.75 | 途中 ~10f | TOCHUU |
| 5 | 3 | 2 | 0.5 | 0.75 | 中 ~10j | JUU |
| 6 | 2 | 4 | 0.75 | 1.0 | に ~10g | NI |
| 7 | 3 | 5 | 0.5 | 1.0 | 12時 ~10b | JUUNI-JI |
| 8 | 4 | 6 | 1.0 | 1.25 | です ~10c | DESU |
| 9 | 5 | 6 | 1.0 | 1.25 | です ~10h | DESU |
| 10 | 6 | 7 | 1.25 | 1.5 | か ~10d | KA |
| 11 | 6 | E | 1.25 | 1.5 | (NONE) | (NONE) |
| 12 | 7 | E | 1.5 | 1.5 | (NONE) | (NONE) |

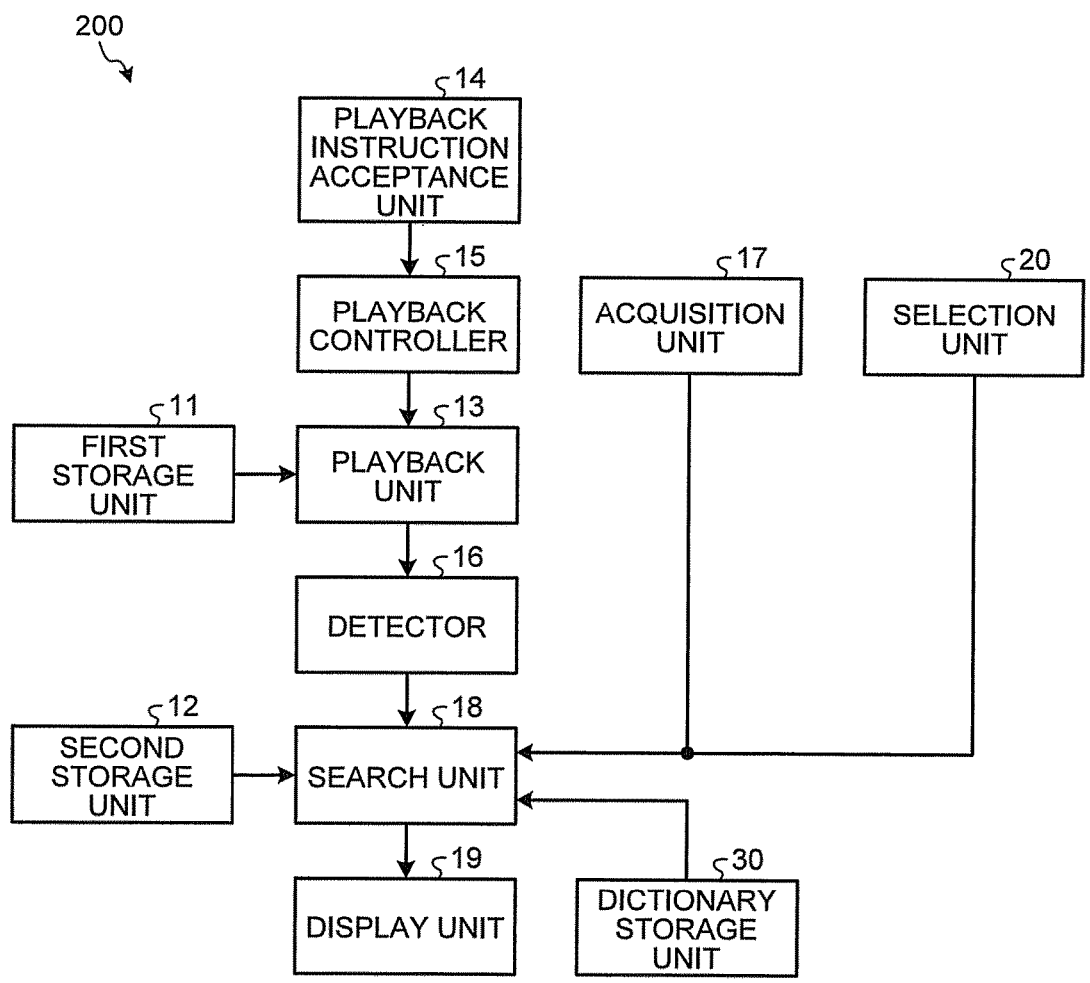

INFORMATION PROCESSING APPARATUS, INFORMATION PROCESSING METHOD AND COMPUTER PROGRAM PRODUCT

CROSS-REFERENCE TO RELATED APPLICATIONS

This application is based upon and claims the benefit of priority from Japanese Patent Application No. 2011-208968, filed on Sep. 26, 2011; the entire contents of which are incorporated herein by reference.

FIELD

Embodiments described herein relate generally to an information processing apparatus, an information processing method, and a computer program product.

BACKGROUND

Various techniques for promoting efficiency in the operation of transcribing voice data into text have conventionally been known. For example, known is a technique for estimating and presenting a phrase to be finally inputted while a user is inputting a character string by use of voice data targeted for transcription. As an example, known is a technique for retrieving (searching for) a phrase that at least a part of a character string representing the reading of the phrase agrees with a character string that is being inputted, from among a plurality of phrases obtained by a voice recognition process on voice data, and presenting the retrieved phrase as an input candidate.

However, there is a problem of low accuracy in the conventional techniques since all phrases included in the record of voice recognition process results become search targets; accordingly, the search results in many candidates.

BRIEF DESCRIPTION OF THE DRAWINGS

FIG. 2A is a view illustrating an example of an voice indices of the embodiment;

FIG. 2B shows Japanese sentences and Japanese phrases;

FIG. 5 is a block diagram illustrating a schematic configuration example of an information processing apparatus according to a modification; and FIG. 6 shows a Japanese word preregistered in a dictionary storage unit.

DETAILED DESCRIPTION

According to an embodiment, an information processing apparatus includes a storage unit, a detector, an acquisition unit, and a search unit. The storage unit stores therein voice indices, each of which associates a character string included in voice text data obtained from a voice recognition process with voice positional information. The voice positional information indicates a temporal position in voice data and corresponds to the character string. The detector detects played-back section information indicating a section that has been played back in the voice data. The acquisition unit acquires reading information being at least a part of a character string representing a reading of a phrase to be transcribed from the voice data that has been played back. The search unit specifies, as search targets, character strings whose associated voice positional information is included in the played-back section information among the character strings included in the voice indices, and retrieves a character string including the reading represented by the reading information from among the specified character strings.

Various embodiments will be described hereinafter with reference to the accompanying drawings. In the following embodiments, a description will be given, taking a PC (Personal Computer) having the function of playing back voice data and the text creation function of creating text in accordance with a user's operation as an example of an information processing apparatus; however, the information processing apparatus is not limited thereto. In the following embodiments, when the transcription operation is performed, the user (transcription operator) operates a keyboard to input text while playing back recorded voice data, and converts the voice data into text.

Figure 1:
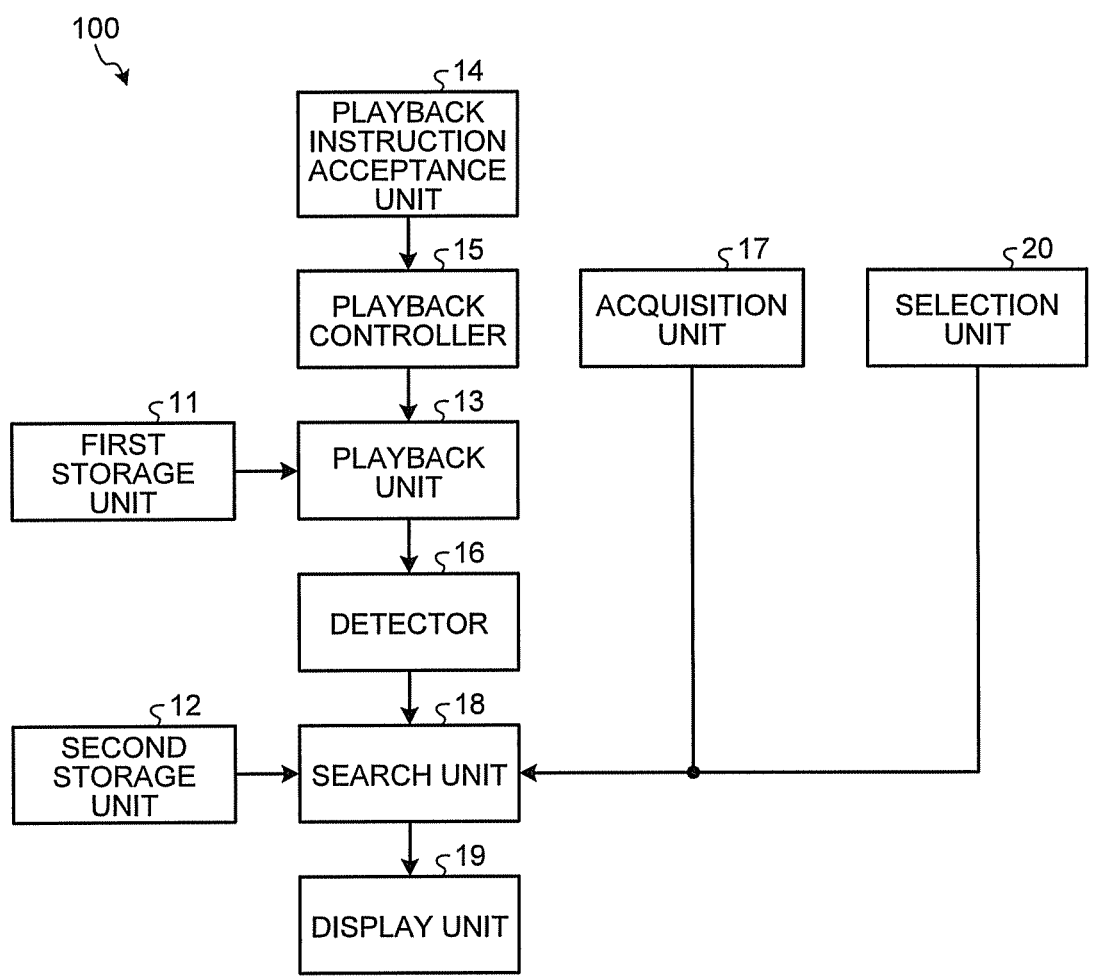
FIG. 1 is a block diagram illustrating a schematic configuration example of an information processing apparatus according to an embodiment.

FIG. 1 is a block diagram illustrating a schematic configuration example of an information processing apparatus 100 according to an embodiment. As illustrated in FIG. 1, the information processing apparatus 100 includes a first storage unit 11, a second storage unit 12, a playback unit 13, a playback instruction acceptance unit 14, a playback controller 15, a detection unit 16, an acquisition unit 17, a search unit 18, a display unit 19, and a selection unit 20.

The first storage unit 11 stores therein voice data. The voice data is, for example, an audio file in a format such as way and mp3. The method for acquiring voice data is arbitrary, and for example, it is possible to acquire voice data via a network such as the Internet, or to acquire voice data by use of a microphone and the like.

The second storage unit 12 configured to store therein voice indices, each of which associates a character string included in text data (referred to as the voice text data) obtained from a voice recognition process with voice positional information, for which the voice positional information indicates a temporal position in the voice data and corresponds to the character string. Various known techniques can be used for the voice recognition process. In the voice recognition process, voice data are processed at regular intervals of approximately 10 to 20 milliseconds (ms). The association of the voice text data with the voice positional information can be acquired during the recognition process on the voice data.

In this embodiment, the voice text data obtained from the voice recognition process is divided into segments, such as words, morphemes, or clauses, each of which is smaller than a sentence, and the voice text data is expressed by a network-structure called lattice in which recognition candidates (candidates for segmentation) are connected. The expression of the voice text data is not limited thereto. For example, the voice text data can also be expressed by a linear structure (one path) indicative of the optimum recognition result of the voice recognition process. In this embodiment, the second storage unit 12 configured to store therein voice indices, each of which associates a morpheme (an example of a character string) included in the voice text data in the lattice structure with voice positional information.

FIG. 2A illustrates an example of voice indices of voice data 10 corresponding to a Japanese sentence 10A (it is read "kyouto juuni-ji desu ka") shown in FIG. 2B constituted by a Japanese word 10a (it is read "kyouto") a Japanese word 10*b* (it is read "juuni-ji"), a Japanese word 10*c* (it is read "desu"), and a Japanese word 10*d* (it is read "ka"). In this embodiment, the voice positional information of a certain part of the voice data is expressed using temporal information indicative of a duration time (in seconds) necessary for playback from the head of the part to the tail of the part. For example, voice positional information corresponding to "juuni-ji" in FIG. 2A, is "0.5 s (500 ms)" to "1.0 s (1000 ms). This means that the period of the voice of "juuni-ji" starts at 0.5 s from the head of the voice data and ends at 1.0 s from the head of the voice data.

Figure 3:
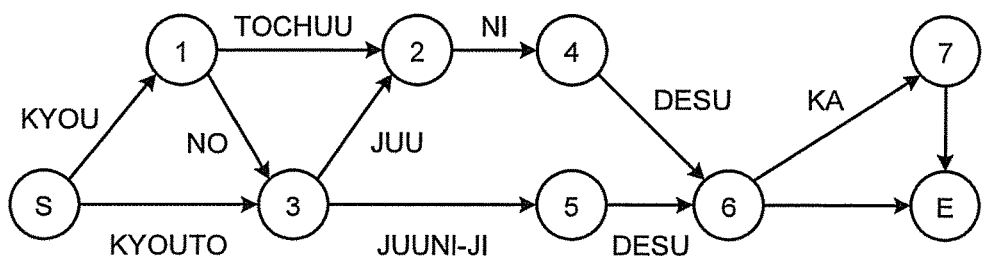
FIG. 3 is a view illustrating an example of a lattice structure of the embodiment.

FIG. 3 is a view graphing a lattice structure obtained by voice recognition of the voice data IO. In FIG. 3, nodes for separating morphemes are represented by circles, and numerals in the circles are IDs that identify the nodes. The morphemes illustrated in FIG. 3 are represented by straight lines connecting the nodes. In the example of FIG. 3, at least a part of each path between a node S to a node E can be set as a recognition candidate. For example, "kyouto juuni-ji desu ka" that the morphemes are connected on the path between the node S and the node E may be a recognition candidate, or the Japanese word "kyouto" between the node S and a node 3 and the Japanese word "kyou" between the node S and a node 1 may be recognition candidates.

The playback unit 13 is a unit that plays back voice data, and is equipment configured of a speaker, a DA converter, and a headphone, for example. When the playback instruction acceptance unit 14 accepts a playback start instruction to start playback, the playback controller 15 controls the playback unit 13 so as to play back the voice data. Moreover, when the playback instruction acceptance unit 14 accepts a playback stop instruction to stop playback, the playback controller 15 controls the playback unit 13 so as to stop playback of the voice data. The playback controller 15 is realized by the audio function held by the operation system or driver of a PC, for example, but can be made by the hardware circuit such as an electronic circuit, too.

The detection unit 16 detects played-back section information that indicates a section that has been played back by the playback unit 13 in the voice data. More specifically, the detection unit 16 detects temporal information that indicates the section between a playback start position indicating a position where playback by the playback unit 13 is started and a playback stop position indicating a position where playback by the playback unit 13 is stopped, in the voice data as the played-back section information.

The acquisition unit 17 acquires reading information that is at least a part of a character string representing the reading of a phrase to be transcribed from voice data that has been played back by the playback unit 13. For example, when a user attempts to transcribe the Japanese word 10*a* (it is read "kyouto") in FIG. 2A and inputs "ki" out of the character string "kyouto" representing the reading of the Japanese word 10*a* by a keyboard operation, the acquisition unit 17 acquires the "ki" as reading information. Moreover, for example, when the entire character string "kyouto" representing the reading of the Japanese word 10*a* is inputted, the acquisition unit 17 acquires the inputted "kyouto" as reading information. In short, the acquisition unit 17 can acquire at least a part of a character string representing the reading of a phrase that the user is attempting to transcribe as reading information.

The search unit 18 specifies, as search targets, character strings whose associated voice positional information is included in the played-back section information detected by the detection unit 16 among a plurality of character strings included in the voice indices stored in the second storage unit 12. For example, when the playback start position of the voice data is "0 s" and the playback stop position is "1.5 s (1500 ms)", the detection unit 16 detects temporal information that indicates the section between the playback start position "0 s" and the playback stop position "1.5 s (1500 ms)" as the playback section information. In this case, the search unit 18 specifies, as character strings targeted for a search, character strings whose associated voice positional information is included in the section between "0 s" and "1.5 s (1500 ms)" among the plurality of character strings included in the voice indices stored in the second storage unit 12. The search unit 18 then retrieves, from among the character strings specified in this manner, character strings including the reading represented by the reading information acquired by the acquisition unit 17.

For example, assume that the plurality of character strings illustrated in FIG. 2A is specified as search targets, and the reading information acquired by the acquisition unit 17 is "ki." When the unit of search is in words, the search unit 18 specifies the Japanese words 10*a* and 10*e* in FIG. 2A, which include the reading "ki," as character stings that match the search condition. For example, when the unit of search is in phrases, the search unit 18 can also connect nodes following each of the Japanese words 10*a* and 10*e*, which include the reading "ki," to specify a phrase such as the Japanese phrase 10A (it is read "kyouto juuni-ji desu ka") or a Japanese phrase 10B (it is read "kyou tochuu ni desu ka") shown in FIG. 2B constituted by the Japanese word 10*e* (it is read "kyou"), a Japanese word 10*f* (it is read "tochuu"), a Japanese word 10*g* (it is read "ni"), a Japanese word 10*h* (it is read "desu"), and the Japanese word 10*d* (it is read "ka") as a character string that matches the search condition.

The display unit 19 controls an unillustrated display device so as to display the character strings retrieved by the search unit 18 as input candidates. For example, it is possible to display character strings in the unit of words as input candidates, or display character strings in the unit of phrases as input candidates. The user (transcription operator) can make a select input to specify which displayed input candidates is selected. The select input method is arbitrary, and for example, it is possible to make the select input by touching a position where an input candidate the user wishes to select is displayed on a screen of the display device, or it is possible to make the select input by the operation of an operation device such as a keyboard, a mouse, or a pointing device. When accepting the select input of the input candidate, the selection unit 20 selects an input candidate specified by the select input, and determines the selected input candidate as input text. In this embodiment, character strings written in combination with Kanji characters are presented as input candidates to promote efficiency in the input operation by the user.

Figure 4:
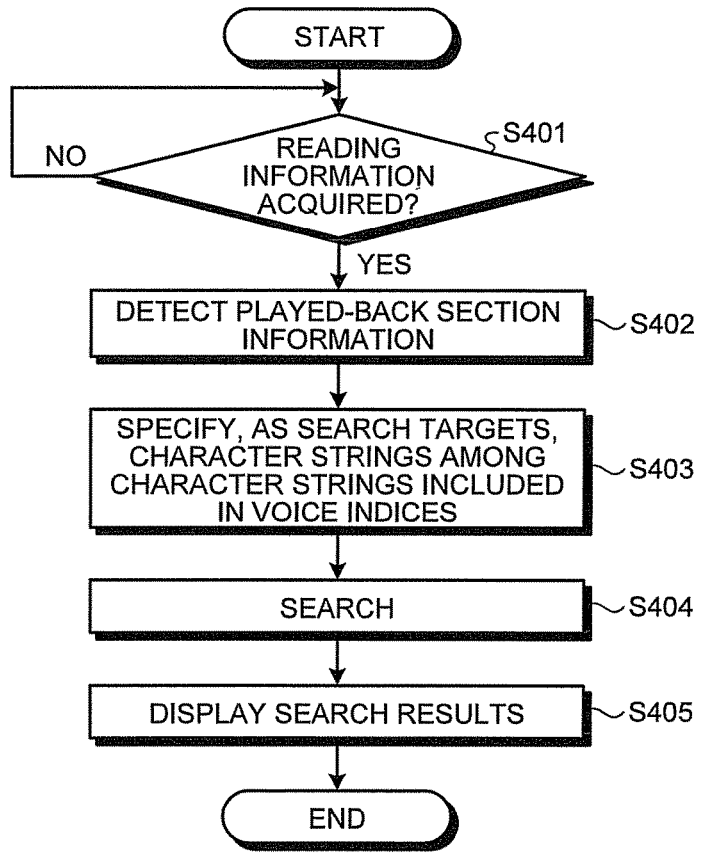
FIG. 4 is a flowchart illustrating an example of process operations performed by the information processing apparatus of the embodiment.

FIG. 4 is a flowchart illustrating an example of process operations performed by the information processing apparatus 100 of this embodiment. As illustrated in FIG. 4, firstly, if the acquisition unit 17 acquires the reading information (result of Step S401: Yes), the detection unit 16 detects the played-back section information (Step S402). More specifically, the detection unit 16 detects, as the played-back section information, temporal information that indicates the section between an immediately previous playback start position and a playback stop position in the voice data. If playback of the voice data is not being stopped (if during playback), the detection unit 16 can also detect the played-back section information, regarding the current playback position as the playback stop position.

Next, the search unit 18 specifies, as search targets, character strings by use of the played-back section information detected in Step S402 among the plurality of character strings included in the voice indices stored in the second storage unit 12 (Step S403). Next, the search unit 18 retrieves character strings including the reading represented by the reading information acquired in Step S401 from among the character strings specified in Step S403 (Step S404).

Next, the display unit 19 controls the unillustrated display device so as to display the character strings retrieved in Step S404 as input candidates (Step S405).

As a specific example, assume that the character string "juu" is acquired as reading information (Step S401 in FIG. 4), the immediately previous playback start position is "0 s" and the playback stop position is "1.5 s (1500 ms)" (Step S402 in FIG. 4), and the plurality of character strings illustrated in FIG. 2A is specified as search targets (Step S403 in FIG. 4).

In this case, the search unit 18 retrieves character strings including the reading "juu" from among the plurality of character strings illustrated in FIG. 2A (Step S404 in FIG. 4). When the unit of search targets is in words, the search unit 18 specifies the Japanese word 10b (it is read "juuni-ji") and a Japanese words 10j (it is read "juu"), which include the reading "juu," as input candidates (character strings that match the search condition). Moreover, when the unit of search targets is in phrases, for example, the search unit 18 can also connect nodes following each of the Japanese words 10b and 10j, which include the reading "juu," to specify a Japanese phrase 10A' shown in FIG. 2B (it is read "juuni-ji desu ka") constituted by the Japanese word 10b, 10c, and 10d, and a Japanese phrase 10B' shown in FIG. 2B (it is read "juu ni desu ka") constituted by the Japanese word 10j, 10g, 10h, and 10d as input candidates. It is possible to arbitrarily change how many of the following nodes are connected to list them as input candidates. For example, when an input candidate is a certain length or shorter, it is possible to connect the following nodes. Moreover, it is also possible to decide how many of the following nodes are connected by use of a certainty factor outputted by a voice recognition system, for example. The display unit 19 then controls the display device so as to display the input candidates (Step S405 in FIG. 4).

As described above, in this embodiment, when the acquisition unit 17 acquires reading information that is at least a part of a character string representing the reading of a phrase that the user is attempting to transcribe, the search unit 18 specifies character strings that include the associated voice positional information in the played-back section information detected by the detection unit 16 as search targets among the plurality of character strings included in the voice indices. The search unit 18 then retrieves character strings including the reading represented by the reading information from among the specified character strings; accordingly, it is possible to improve accuracy in the search process compared with a case where all character strings included in the voice indices become search targets.

In this embodiment, the first storage unit 11, the second storage unit 12 and the playback unit 13 are configured of hardware circuits. On the other hand, each of the playback instruction acceptance unit 14, the playback controller 15, the detection unit 16, the acquisition unit 17, the search unit 18, the display unit 19, and the selection unit 20 is realized by a CPU mounted on the PC executing a program stored in ROM or the like; however, the configuration is not limited thereto, and for example, at least parts of the playback instruction acceptance unit 14, the playback controller 15, the detection unit 16, the acquisition unit 17, the search unit 18, the display unit 19, and the selection unit 20 may be configured of hardware circuits.

Moreover, the information processing apparatus may be realized by preinstalling the above program on a computer device, or may be realized by storing the above program in a recording medium such as a CD-ROM or distributing the above program via a network and appropriately installing the program on a computer device. Moreover, if various data files utilized to use a language processing technique and a pronunciation estimation technique are necessary, it is possible to realize recording media for holding the data files by appropriately using memory and a hard disk, which are installed internally or externally on the above computer device, or a CD-R, CD-RW, a DVD-RAM, a DVD-R and the like.

As described above, the description has been given of the embodiment of the present invention; however, the embodiment has been presented by way of an example only, and is not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, it is also possible to view a configuration excluding at least either of the elements for playing back voice data (the first storage unit 11, the playback unit 13, the playback instruction acceptance unit 14, the playback controller 15, for example) and the element for displaying search results (the display unit 19 as an example here) from all the elements shown in the embodiment (the first storage unit 11, the second storage unit 12, the playback unit 13, the playback instruction acceptance unit 14, the playback controller 15, the detection unit 16, the acquisition unit 17, the search unit 18, the display unit 19 and the selection unit 20) as the information processing apparatus according to the present invention, for example. In short, various inventions can be formed by appropriately combining a plurality of the elements disclosed in the embodiment.

Modifications will be described in the following. The following modifications can be combined arbitrarily.

(1) First Modification

As illustrated in FIG. 5, for example, an information processing apparatus 200 may be configured to further include a dictionary storage unit 30 in which a plurality of character strings is preregistered. In the example of FIG. 5, a plurality of preselected character strings has been registered in the dictionary storage unit 30 in the initial state. Character strings determined as input text (character strings that a conversion process such as conversion of hiragana into Kanji has been determined and inputted) are sequentially registered in the dictionary storage unit 30. The search unit 18 retrieves character strings including the reading represented by the reading information acquired by the acquisition unit 17 from among the character strings specified as search targets from the voice indices stored in the second storage unit 12 and the character strings registered in the dictionary storage unit 30.

For example, assume that the plurality of character strings illustrated in FIG. 2A is specified as search targets, the reading information acquired by the acquisition unit 17 is "ki," and a Japanese word 60 (it is read "kinou") as shown in FIG. 6 including the reading "ki" has been registered in the dictionary storage unit 30. When the unit of search targets is in words, the search unit 18 specifies the Japanese word 10*e* (it is read "kyou") and the Japanese word 10*a* (it is read "kyouto") shown in FIG. 2A, which include the reading "ki," as character strings that match the search condition from among the plurality of character strings illustrated in FIG. 2A. Moreover, the search unit 18 specifies the Japanese word 60 as a character string that matches the search condition from among the plurality of character strings registered in the dictionary storage unit 30. In this case, the display unit 19 controls the display device so as to display the Japanese words 10*a*, 10*e*, and 60 (they are read "kyouto," "kyou," and "kinou," respectively), which are the character strings specified by the search of the search unit 18 as input candidates.

Moreover, for example, assume that the plurality of character strings illustrated in FIG. 2A is specified as search targets, the reading information acquired by the acquisition unit 17 is "kino," and the Japanese word 60 (it is read "kinou") including the reading "kino" has been registered in the dictionary storage unit 30. For convenience of description, the unit of search targets is assumed to be in words. In this case, there is no word including the reading "kino" in the plurality of character strings illustrated in FIG. 2A; however, the Japanese word 60 including the reading "kino" has been registered in the dictionary storage unit 30, and therefore the search unit 18 specifies the Japanese word 60 as a character string that matches the search condition from among the plurality of character strings registered in the dictionary storage unit 30. In this case, the display unit 19 controls the display device so as to display the Japanese word 60 being the character string specified by the search of the search unit 18 as an input candidate.

(2) Second Modification

In the above embodiment, the search unit 18 specifies character strings that include the associated voice positional information in the playback section information detected by the detection unit 16 as search targets from among the plurality of character strings included in the voice indices; however, a search target is not limited to this, and for example, it is also possible to specify character strings that include the associated character strings in the section that the section indicated by the playback section information is extended by a predetermined range as search targets among the plurality of character strings included in the voice indices.

(3) Third Modification

In the above embodiment, the language targeted for the transcription operation is Japanese; however, the language is not limited to this, and the kinds of languages targeted for the transcription operation are arbitrary. For example, the language targeted for the transcription operation may be English or Chinese. Even if the language targeted for the transcription operation is English or Chinese, the configuration of the information processing apparatus is similar to the one for Japanese.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus for displaying a transcript generated by an automatic voice recognition process to a user for correction of the automatically generated transcripts by the user, the apparatus comprising:

a storage unit configured to store therein voice indices, each of which associates a character string included in voice text data obtained from an automatic voice recognition process with voice positional information, the voice positional information indicating a temporal position in voice data and corresponding to the character string, wherein the automatic voice recognition process is performed on an audio file to obtain a transcript of the audio file, wherein the voice text data is the transcript, and wherein the voice positional information is one or two timestamps associated with each character string of the transcript;

a display for displaying the transcript of the audio file to a transcribing user;

an input interface for receiving, from the transcribing user, selection of a portion of the audio file for playback, text input via a keyboard, and selection input for selecting one of a plurality of displayed options; and a processor configured to:

detect playback section information in the voice data, the playback section information indicating temporal information from a start position instructed by the transcribing user to a stop position instructed by the transcribing user by correcting the transcript generated from performing the automatic voice recognition on the audio file via manual keyboard input to input interface;

receive text from the transcribing user during the transcribing operation, the transcribing user being a user who performs a transcribing operation, the transcribing operation being an operation in which the transcribing user inputs a text corresponding to the voice data being played back while listening to the voice data being played back, the playback section information being information indicating a part of the voice data, the part being a section for which playback has bcing been completed or a section that has already been played back at least once;

phonetically transcribe the character string or an initial portion of the character string to acquire reading information that is at least a part of a character string of a phrase to be transcribed from the voice data that has been played back, wherein the reading information is a phonetic pronunciation of at least part of the character string, and wherein the reading information is generated from the text input by the transcribing user in accordance with the transcribing operation by the transcribing user;

specify, as search targets, character strings whose associated voice positional information is included in the playback section information among the character strings included in the voice indices;

retrieve one or more character strings including a reading information matching the reading information input by the transcribing user, from among the specified character strings;

display, as input candidates to the transcribing user, when the character string retrieved from the search targets includes more than one retrieved character string, the character strings having reading information matching the reading information input by the transcribing user and also having voice positional information included in the voice positional information of the playback section;

receive a selection of one of the input candidates from the transcribing user as a replacement character string; and replace the retrieved character string in the transcript with the replacement character string.

2. The apparatus according to claim 1, wherein the voice text data has a lattice structure that is a network structure in which recognition candidates are connected.

3. The apparatus according to claim 1, further comprising a dictionary storage unit configured to store therein a dictionary in which a plurality of character strings is preregistered, wherein the processor is further configured to retrieve a character string including the reading information from among the character strings registered in the dictionary storage unit.

4. The apparatus according to claim 1, wherein the processor is further configured to play back the voice data.

5. An information processing method for displaying a transcript generated by an automatic voice recognition process to a user for correction of the automatically generated transcripts by the user, the method comprising:

detecting playback section information in voice data, the playback section information indicating temporal information from a start position instructed by a transcribing user to a instructed by the transcribing user, the transcribing user being a user who performs a transcribing operation by correcting a transcript generated from performing an automatic voice recognition on an audio file via manual keyboard input to an input interface, wherein the input interface is for receiving, from the transcribing user, selection of a portion of the audio file for playback, text input via a keyboard, and selection input for selecting one of a plurality of displayed options;

receiving text from the transcribing user during the transcribing operation, the transcribing operation being an operation in which the transcribing user inputs a text corresponding to the voice data being played back while listening to the voice data being played back, the playback section information being information indicating a part of the voice data, the part being a section for which playback has been completed or a section that has already been played back at least once;

phonetically transcribing the character string or an initial portion of the character string to acquire reading information that is at least a part of a character string of a phrase to be transcribed from the voice data that has been played back, wherein the reading information is a phonetic pronunciation of at least part of the character string, and wherein the reading information is generated from the text input by the transcribing user in accordance with the transcribing operation by the transcribing user;

specifying, among character strings included in voice indices, each of which associates a character string included in voice text data obtained from an automatic voice recognition process with voice positional information, the voice positional information indicating a temporal position in the voice data and corresponding to the character string, character strings whose associated voice positional information is included in the playback section information as search targets, wherein the automatic voice recognition process is performed on the audio file to obtain a transcript of the audio file, wherein the voice text data is the transcript, and wherein the voice positional information is one or two timestamps associated with each character string of the transcript; and retrieving one or more character strings including a reading information matching the reading information input by the transcribing user, from among the specified character strings;

displaying, as input candidates to the transcribing user, when the character string retrieved from the search targets includes more than one retrieved character string, the character strings having reading information matching the reading information input by the transcribing user and also having voice positional information included in the voice positional information of the playback section;

receiving a selection of one of the input candidates from the transcribing user as a replacement character string; and replacing the retrieved character string in the transcript with the replacement character string.

6. A computer program product comprising a non-transitory computer-readable medium including programmed instructions for displaying a transcript generated by an automatic voice recognition process to a user for correction of the automatically generated transcripts by the user, wherein the instructions, when executed by a computer, cause the computer to execute:

detecting playback section information in voice data, the playback section information indicating temporal information from a start position instructed by the transcribing user to a stop position instructed by the transcribing user, the transcribing user being a user who performs a transcribing operation by correcting a transcript generated from performing an automatic voice recognition on an audio file via manual keyboard input to an input interface, wherein the input interface is for receiving, from the transcribing user, selection of a portion of the audio file for playback, text input via a keyboard, and selection input for selecting one of a plurality of displayed options;

receiving text from the transcribing user during the transcribing operation, the transcribing operation being an operation in which the transcribing user inputs a text corresponding to the voice data being played back while listening to the voice data being played back, the playback section information being information indicating a part of the voice data, the part being a section for which playback has been completed or a section that has already been played back at least once;

phonetically transcribing the character string or an initial portion of the character string to acquire reading information that is at least a part of a character string of a phrase to be transcribed from the voice data that has been played back, wherein the reading information is a phonetic pronunciation of at least part of the character string, and wherein the reading information is generated from the text input by the transcribing user in accordance with the transcribing operation by the transcribing user;

specifying, among character strings included in voice indices, each of which associates a character string included in voice text data obtained from an automatic voice recognition process with voice positional information, the voice positional information indicating a temporal position in the voice data and corresponding to the character string, character strings whose associated voice positional information is included in the playback section information as search targets, wherein the automatic voice recognition process is performed on the audio file to obtain a transcript of the audio file, wherein the voice text data is the transcript, and wherein the voice positional information is one or two timestamps associated with each character string of the transcript; and retrieving one or more character strings including a reading information matching the reading information input by the transcribing user, from among the specified character strings;

displaying, as input candidates to the transcribing user, when the character string retrieved from the search targets includes more than one retrieved character string, the character strings having reading information matching the reading information input by the transcribing user and also having voice positional information included in the voice positional information of the playback section;

receiving a selection of one of the input candidates from the transcribing user as a replacement character string; and replacing the retrieved character string in the transcript with the replacement character string.

7. An information processing apparatus for displaying a transcript generated by an automatic voice recognition process to a user for correction of the automatically generated transcripts by the user, the apparatus comprising:

a storage unit configured to store therein voice indices, each of which associates a character string included in voice text data obtained from an automatic voice recognition process with voice positional information, the voice positional information indicating a temporal position in voice data and corresponding to the character string, wherein the automatic voice recognition process is performed on an audio file to obtain a transcript of the audio file, wherein the voice text data is the transcript, and wherein the voice positional information is one or two timestamps associated with each character string of the transcript;

a display for displaying the transcript of the audio file to a transcribing user;

an input interface for receiving, from the transcribing user, selection of a portion of the audio file for playback, text input via a keyboard, and selection input for selecting one of a plurality of displayed options;

a detecting circuit configured to detect playback section information in the voice data, the playback section information indicating temporal information from a start position instructed by the transcribing user to a stop position instructed by the transcribing user, the transcribing user being a user who performs a transcribing operation by correcting the transcript generated from performing the automatic voice recognition on the audio file via manual keyboard input to input interface;

a text receiving circuit configured to receive text from the transcribing user during the transcribing operation, the transcribing operation being an operation in which the transcribing user inputs a text corresponding to the voice data being played back while listening to the voice data being played back, the playback section information being information indicating a part of the voice data, the part being a section for which playback has been completed or a section that has already been played back at least once;

an acquiring circuit configured to phonetically transcribe the character string or an initial portion of the character string to acquire reading information that is at least a part of a character string of a phrase to be transcribed from the voice data that has been played back, wherein the reading information is a phonetic pronunciation of at least part of the character string, and wherein the reading information is generated from the text input by the transcribing user in accordance with the transcribing operation by the transcribing user;

a searching circuit configured to specify, as search targets, character strings whose associated voice positional information is included in the playback section information among the character strings included in the voice indices, and retrieve one or more character strings including a reading information matching the reading information input by the transcribing user, from among the specified character strings;

a displaying circuit configured to display, as input candidates to the transcribing user, when the character string retrieved from the search targets includes more than one retrieved character string, the character strings having reading information matching the reading information input by the transcribing user and also having voice positional information included in the voice positional information of the playback section;

a selection receiving circuit configured to receive a selection of one of the input candidates from the transcribing user as a replacement character string; and a replacing circuit configured to replace the retrieved character string in the transcript with the replacement character string.

8. The apparatus according to claim 7, wherein the voice text data has a lattice structure that is a network structure in which recognition candidates are connected.

9. The apparatus according to claim 7, further comprising a dictionary storage unit configured to store therein a dictionary in which a plurality of character strings is preregistered, wherein
the searching circuit retrieve a character string including the reading information from among the character strings registered in the dictionary storage unit.

10. The apparatus according to claim 7, further comprising a playback circuit configured to play back the voice data.

* * * * *